United States Patent
Tanaka et al.

(10) Patent No.: US 6,269,896 B1
(45) Date of Patent: Aug. 7, 2001

(54) RADIATOR COVER ASSEMBLY FOR A MOTORCYCLE

(75) Inventors: Koichi Tanaka; Hiroaki Hasumi; Nobutaka Tokumasu, all of Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,814

(22) Filed: Oct. 18, 1999

(30) Foreign Application Priority Data

Oct. 18, 1998 (JP) .................................. 10-313968

(51) Int. Cl.⁷ ............................ B62D 25/10; B60K 11/00
(52) U.S. Cl. .................... 180/69.24; 180/229; 180/68.1; 180/68.3; 280/288.4
(58) Field of Search ...................... 180/229, 68.1, 180/68.3, 68.4, 903, 69.24, 219; 280/288.4

(56) References Cited

U.S. PATENT DOCUMENTS

| | | | |
|---|---|---|---|
| 4,685,530 | * | 8/1987 | Hara ..................................... 180/219 |
| 4,709,774 | * | 12/1987 | Saito et al. ........................... 180/229 |
| 4,830,135 | * | 5/1989 | Yamashita ............................. 180/229 |
| 5,016,725 | * | 5/1991 | Muramatsu ........................... 180/225 |
| 5,577,570 | * | 11/1996 | Shiohara et al. ...................... 180/219 |
| 5,715,904 | * | 2/1998 | Takahashi et al. .................... 180/229 |
| 5,745,023 | * | 4/1998 | Totsuka ................................. 337/160 |
| 6,105,701 | * | 8/2000 | Buell ..................................... 180/229 |

FOREIGN PATENT DOCUMENTS

Y2-326060  6/1991  (JP) .

* cited by examiner

Primary Examiner—Brian L. Johnson
Assistant Examiner—Bridget Avery
(74) Attorney, Agent, or Firm—Birch, Stewart, Kolasch & Birch, LL

(57) ABSTRACT

A radiator cover for covering the side of a radiator. The inside of the radiator cover forms an expelled air path with air being expelled to the outside of the vehicle from an expelled air port of a side section thereof. An intake path for the flow of fresh air is formed in a longitudinal direction and includes an intake port and a duct. An opening section is formed in part of the duct, the opening section being opened and closed by a louver actuated by an actuation member. Expelled air thereby controllably enters the opening section into the duct and is mixed with fresh air. Thus, fresh air can be effectively temperature controlled. The mixed air is expelled from the duct to the rear of the radiator cover.

12 Claims, 7 Drawing Sheets

RADIATOR COVER ASSEMBLY FOR A MOTORCYCLE

BACKGROUND OF THE INVENTION

1. Field of the Invention

This application relates to a radiator cover provided for covering a radiator side section on a motorcycle.

2. Background Art

In Japanese Utility Model publication No. Hei. 3-26060, there is shown a radiator cover assembly for a motorcycle in which the side of an engine is covered from the front of the vehicle by a cowling, and an intake path for passing fresh air in a longitudinal direction of the vehicle, and a plurality of expelled air paths being mutually different in the vertical direction, for passing engine hot air from inside the vehicle to the outside so as to expel the air forward of the vehicle, are formed in air ducts provided in the cowling. Changing of the respective directions of the intake path and the expelled air path in cold weather is also suggested.

With the above described structure, the intake path and the expelled air path respectively separately pass only one of either fresh air or expelled air. This means that it is difficult to make the air flowing out behind the air ducts an appropriate temperature which both provides comfort to a rider and does not have a detrimental effect on the performance of a carburetor, etc. This is particularly true in cold weather.

As suggested in the above described related art publication, even if attempts are made to alter the respective directions of the expelled air path and the intake path, hot air flows directly onto the rider and the carburetor which means that it is not really possible to obtain an appropriate temperature. The object of the present invention is to solve these problems.

SUMMARY OF THE INVENTION

In order to solve the above described problems, a first aspect of the present invention provides a radiator cover used with a motorcycle including an engine and a carburetor connected to this engine, a radiator arranged in front of the carburetor and the engine, and a radiator cover for covering a water tank side of the radiator, with an intake path, for causing fresh air to be guided in a front to rear direction, and an expelled air path for expelling hot air that has been heated by heat exchange with the radiator to the outside from inside the vehicle body, being provided in the radiator cover, in which the radiator is substantially box shaped, an expelled air path for passing expelled air is formed in an internal space, and there is further provided mixing means for mixing some of the expelled air in the expelled air path with fresh air in the intake path.

According to a second aspect of the invention, there is provided a radiator cover assembly for a motorcycle of the first aspect, in which an air blocking plate is provided behind the radiator and in front of the engine and the carburetor, and expelled air from the radiator is directed into the expelled air path of the radiator cover by this windshield plate.

A third aspect of the present invention is the second aspect in which the engine is a horizontally opposed engine.

According to the first aspect of the invention, since it is possible to mix some of the expelled air inside the expelled air path with fresh air using the mixing means provided in the radiator cover, fresh air is made an appropriate temperature and supplied from an outlet of the intake path to the rear of the radiator cover. This means that the comfort of the rider behind the radiator cover is improved and preferable carburetor performance is maintained. Particularly, when the motorcycle is running in a cold district, the effects are more notable because over heating of the rider and icing of the carburetor can be prevented.

According to the second aspect of the invention, expelled air does not flow rearwards because of the air blocking plate behind the radiator, and can be guided in the direction of the radiator cover, which makes it possible to further realize the above described effects.

In a horizontally opposed engine, the carburetor is often arranged behind the radiator in an overlapping manner when viewed from the rear of the motorcycle. However, according to the third aspect of the invention, because of the above described structure, the expelled air does not flow directly to the carburetor but fresh air warmed to an appropriate temperature flows instead, which means that a preferable expelled air processing and intake structure is formed for a horizontally opposed engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
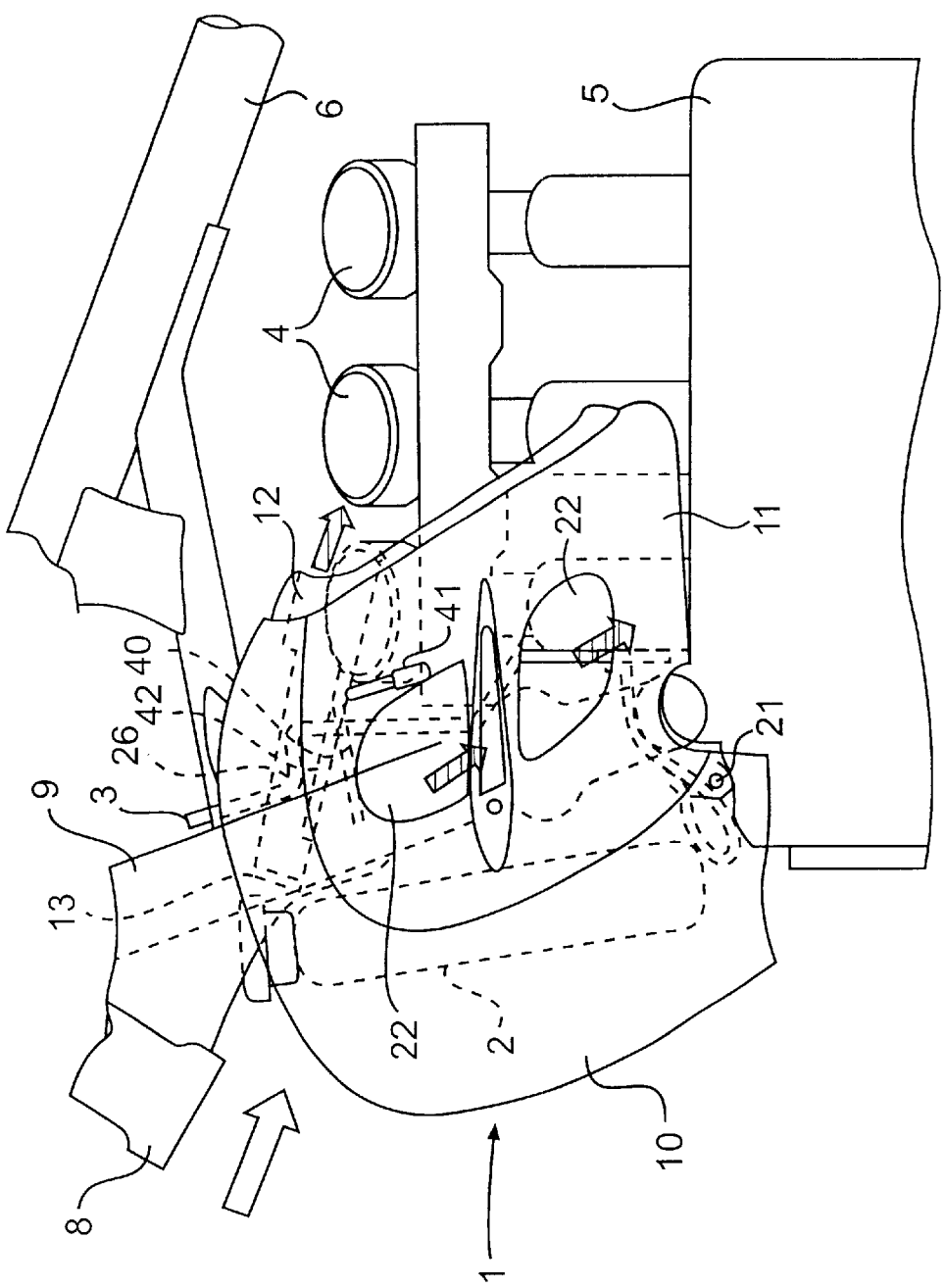
FIG. 1 is a side view illustration of a radiator cover for a motorcycle in accordance with the present invention.

An embodiment of the present invention will now be described based on the attached drawings. In FIG. 1, a radiator cover 1 covers a water tank side of a radiator 2. An air blocking plate 3 is provided behind the radiator 2 and guides air coming out from the radiator to the side of the radiator cover 1.

Carburetors 4 are located further behind the radiator 2 and the air blocking plate 3. These carburetors 4 are connected to intake ports of a horizontally opposed engine 5 underneath and are configured so as to supply a mixture to the engine 5.

Figure 2:
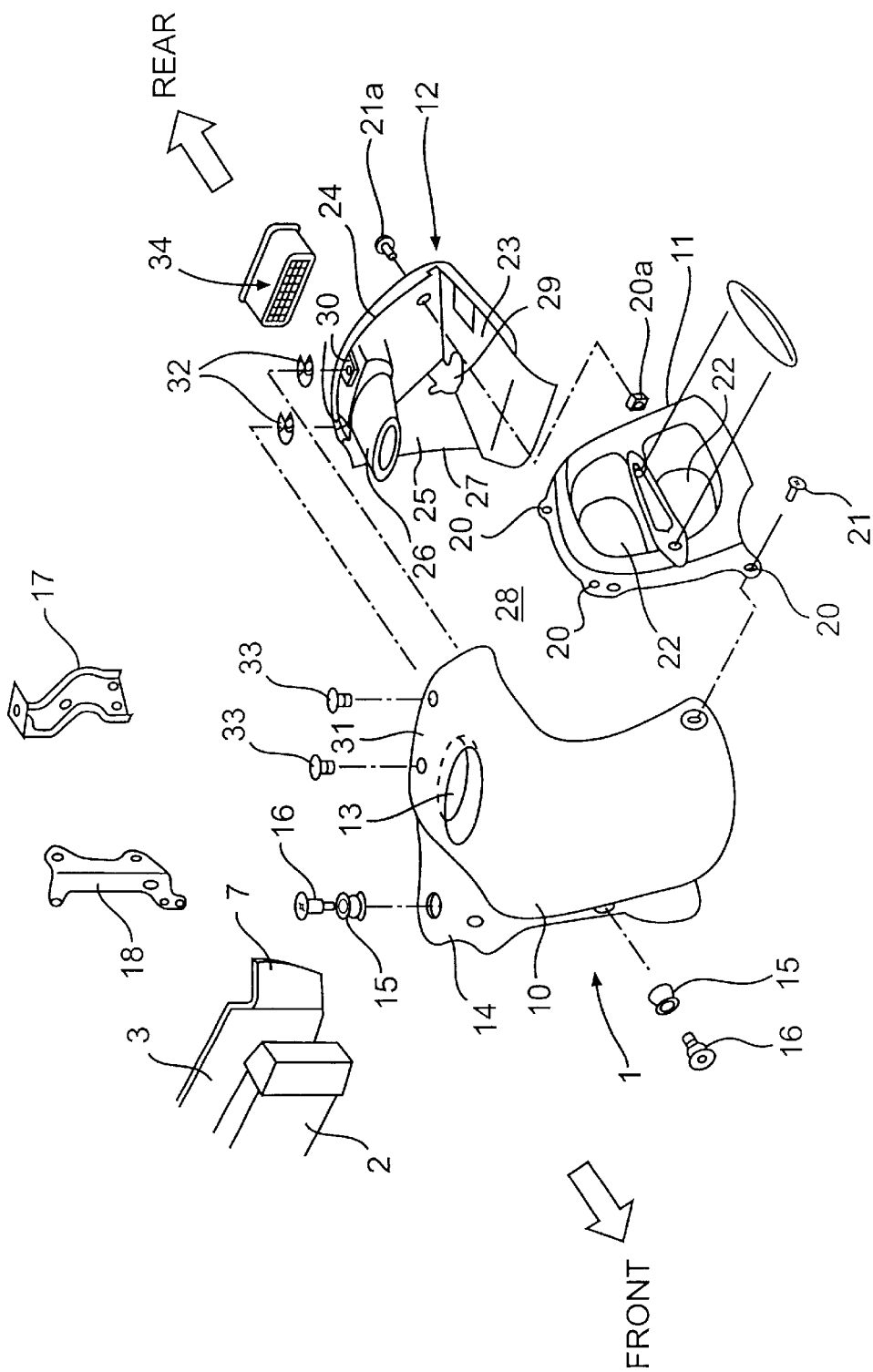
FIG. 2 is an exploded perspective view of the radiator cover.

A larger half of the horizontally opposed engine 5 is arranged so as to be further back than the radiator 2, and the radiator cover 1 is overlaid on the front upper section of the engine 5, and supported by the engine 5, the radiator 2 and a vehicle frame 6. Reference numeral 7 (refer to FIG. 2) represents a guide section of the air blocking plate 3, reference numeral 8 represents a head pipe, and reference numeral 9 represents a down pipe constituting part of the vehicle frame 6.

The radiator cover 1 is substantially box shaped overall, and comprises a front section 10, a side section 11 and a rear section 12. Each of these sections is formed of a heat resistant resin material, for example a mixture of PC and ABS, or PP etc.

FIG. 2 is a drawing showing a method of assembling the radiator cover 1. The front section 10 is curved to cover from the front on the top, both side surfaces are shaped so as to open out, and an intake opening 13 is formed to the front above the side surfaces. Fresh air is taken in through the opening 13 during movement of the motorcycle.

Figure 4:
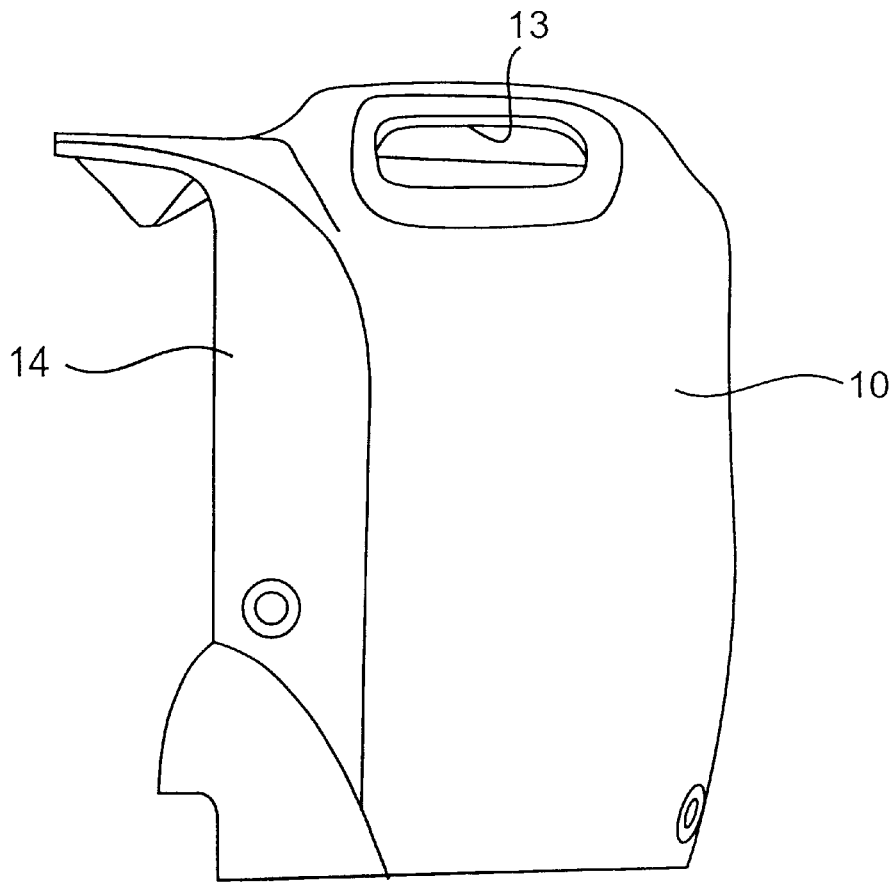
FIG. 4 illustrates the front of the radiator cover from the front of the vehicle.

The side section 11 of the front section 10 inside the vehicle defines a flange section 14 extending to the inside of the vehicle (refer to FIG. 4), and above this flange section 14 a grommet rubber 15 is attached to an upper end of a radiator cover stay 17 by means of a bolt 16. The lower end of the radiator cover stay 17 is attached to the engine 5.

A lower part of the flange section 14 is also attached to a radiator cover stay 18 by means of another grommet rubber 15 and another bolt 16. The radiator cover stay 18 is attached to the radiator 2.

The side section 11 is attached to an outer part of the front section 10 at a peripheral attachment section 20 using screws 21, and a lower front part of the side section 11 is screwed to the front section 10 and the side of the engine 5. A rear side is joined to the rear section 12 using screws 21a and nuts 20a. Expelled air openings 22, open onto two upper and lower footrests at a side surface of the side section 11, and expelled air from the radiator 2 is blown to the outside of the vehicle from these openings 22.

Figure 5:
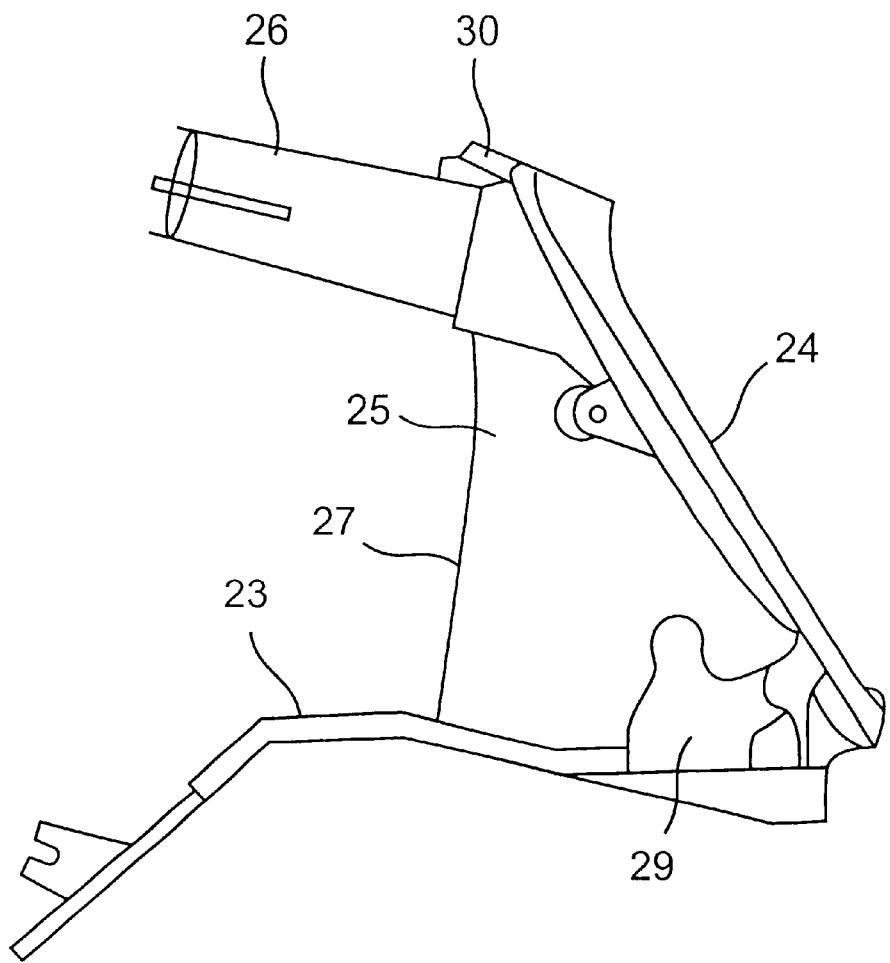
FIG. 5 illustrates the front of the radiator cover from outside the vehicle.
Figure 6:
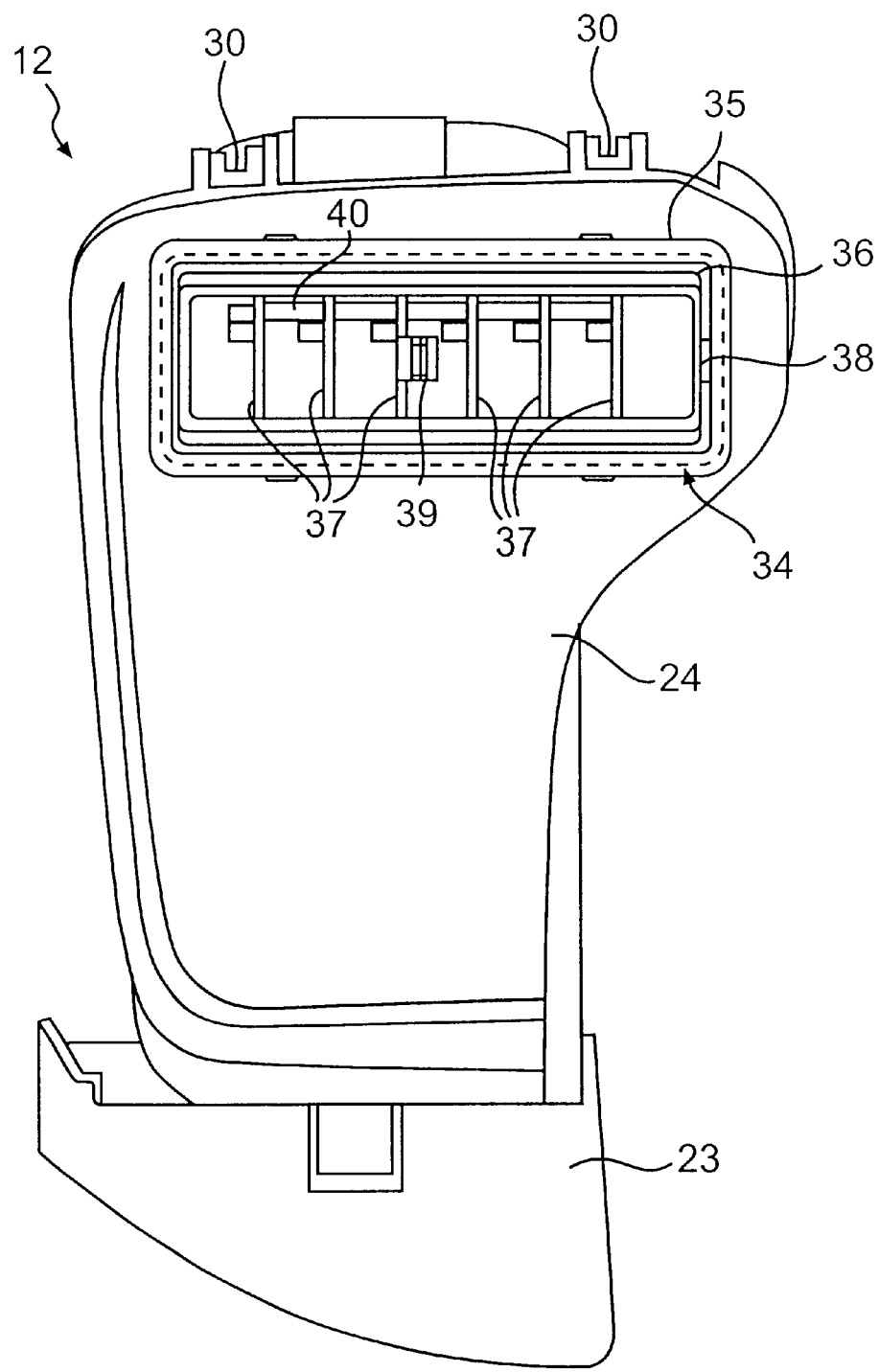
FIG. 6 illustrates the front of the radiator cover from behind the vehicle.

As shown in FIG. 5 and FIG. 6, the rear section 12 is provided with a base wall 23, a rear wall 24 and an inner side wall 25. A duct 26 is formed integrally protruding in a forward direction from the rear wall 24, and connects to the intake port 13 in a tip end of the duct 26 (refer to FIG. 3).

An outer side surface of the rear section 12 is opened, and when the front section 10 and the rear section 12 are joined together a large opening section facing outside the vehicle is formed between the front section 10 and the outer side surface of the rear section 12, but this opening is covered by the side section 11.

A front edge section 27 of the inner side wall 25 is positioned so as to form an opening section inside the vehicle between the front section 10 and the front edge section 27 when the front section 10 and the rear section 12 are joined together, and a guide section 7 having a curved surface formed on a side section of the air blocking plate 3 faces into this opening section.

Figure 3:
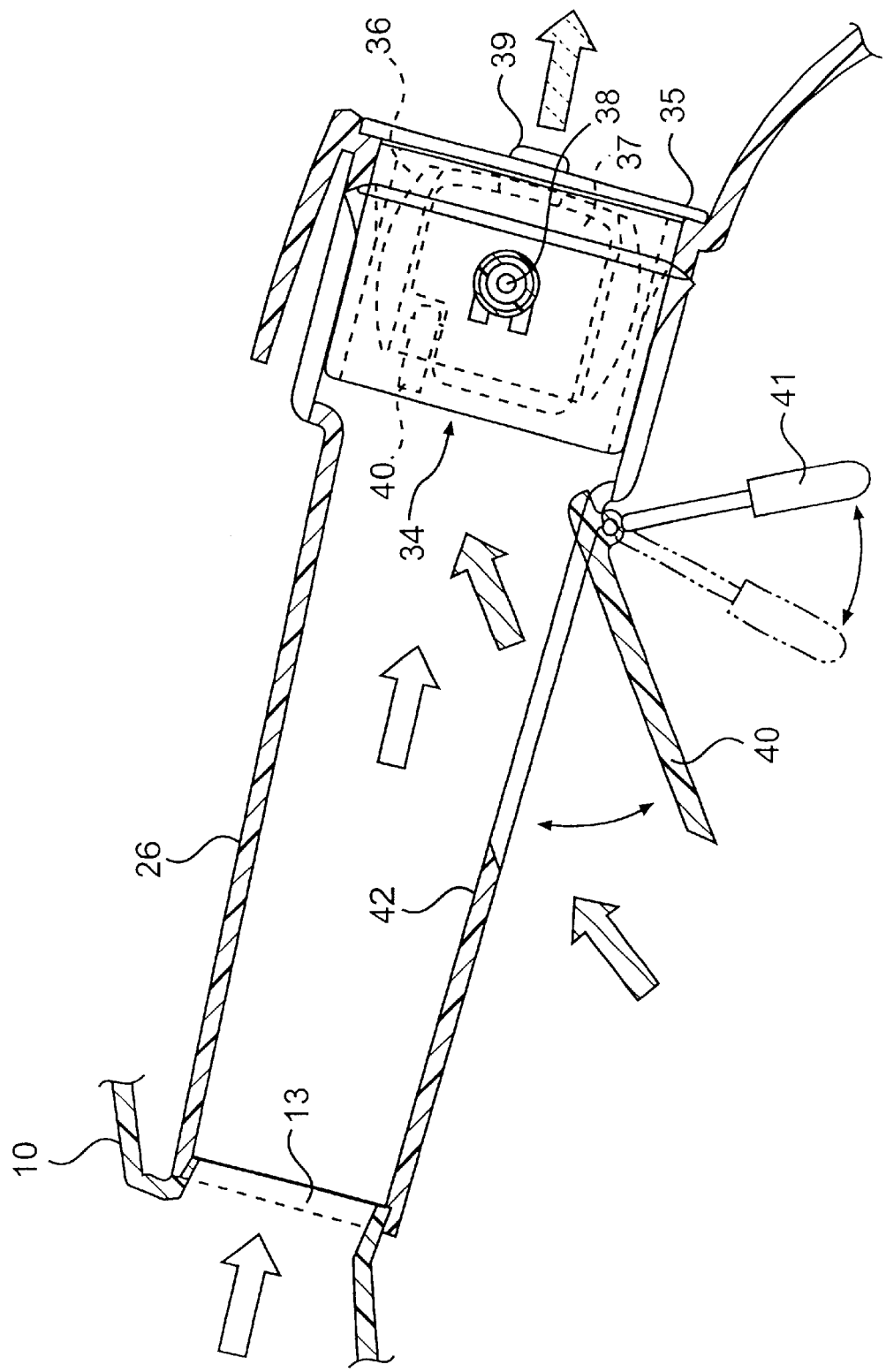
FIG. 3 is a cross sectional view of part of an intake path for fresh air.

This opening section communicates with a substantially sealed inner space of the radiator cover 1 formed by the front section 10, the side section 11 and rear section 12, and this inner space also communicates with an expelled air port 22 to form an expelled air path 28 (FIG. 3). An opening section 29 is also formed at corner sections of the inner side wall 25 and the base wall 23. An attachment section 30 is provided in the rear wall 25, and this attachment section 30 overlaps an upper rear end 31 of the front section 10 and is fastened to nut members 32 using screws 33. An outlet of the duct 26 opens into an upper part of the rear wall 25, and a blowing out adjustment member 34 is housed in this outlet.

As shown in FIG. 5 and FIG. 6, the blowing out adjustment member 34 includes a fixed case 35, a rotating case 36 rotatably supported inside a fixed case 35, and a plurality of louvers 37 provided inside the rotating case 36. The rotating case 36 causes the angle at which air is blown out to be varied in the vertical direction by rotating around a shaft 38 provided in a side surface.

The louvers 37 can also be all moved together in the lateral direction by pressing a knob 39 formed on the central louver 37, so as to vary the inclination, thus making it possible to set the angle at which air is blown out in the lateral direction as well.

Next, mixing means for mixing fresh air with expelled air will be described. In FIG. 3, part of the duct 26 comprises a louver 40, which is opened and closed by an appropriate actuation member 41 such as a lever or a dial. If the louver 40 is opened, some of the expelled air inside the expelled air path 28 flows out from an opening section 42 provided in the duct 26 and is mixed with fresh air at that point.

Figure 7:
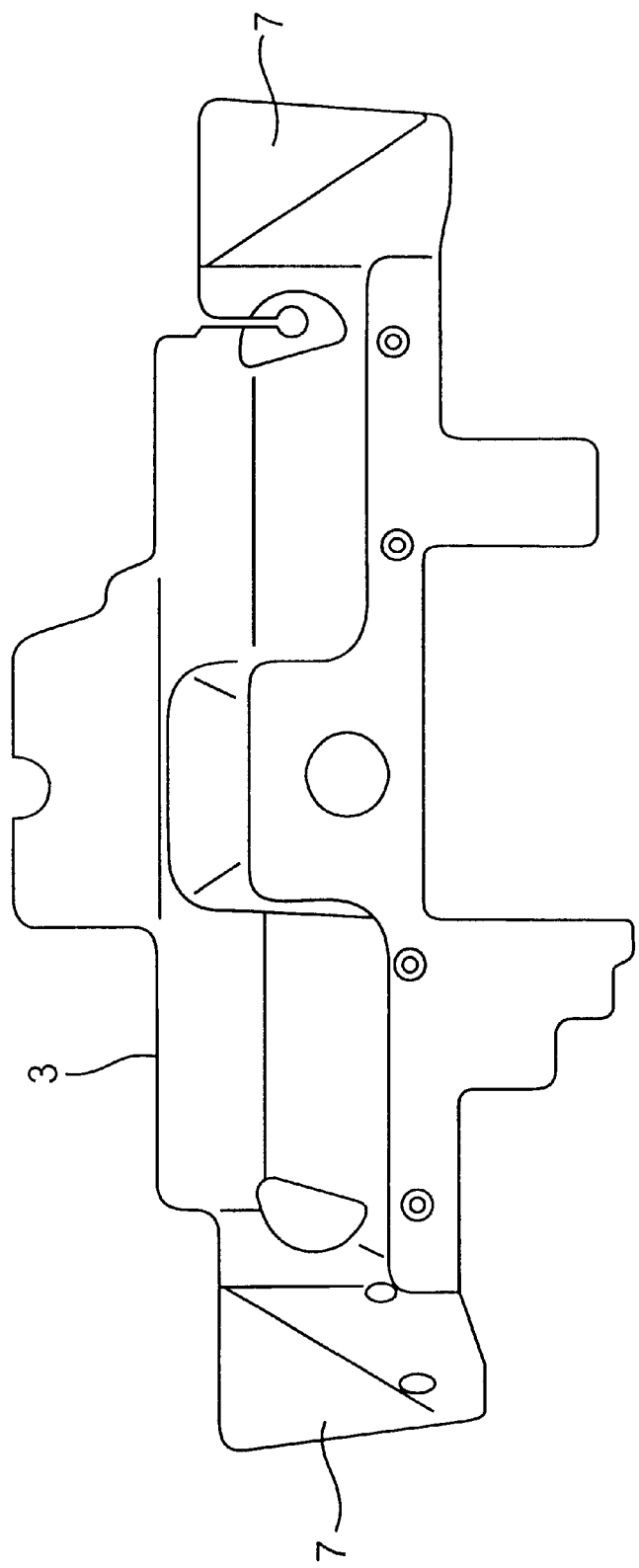
FIG. 7 illustrates an air blocking plate from the front of the vehicle.

Accordingly, the mixing means comprises the louver 40, the actuating member 41 and the opening section 42. The mix ratio of the expelled air is determined by the opening extent of the opening section 42, namely the opening angle of the louver 40, and the degree of mixing is appropriately adjusted so, that the temperature of air blown out from the blowing out adjustment member 34 is in a range which provides comfort to a rider positioned behind the radiator cover 1 and makes it possible to maintain good performance for the carburetor 4. FIG. 7 shows the front surface shape of the air blocking plate 3. The air blocking plate 3 is disposed behind the radiator 2 longitudinally and is attached to the side of the vehicle by inserting into surrounding members, without using fastening components such as bolts, so that expelled air flows directly to the carburetor 4 and the engine 5. A guide section 7 is provided in the side of the air blocking plate, and formed with a sloping surface so that expelled air is introduced into an opening formed in a vehicle side of the radiator cover.

Next, the operation of the embodiment will be described. After assembling the radiator cover 1, it is attached to the side of the vehicle so as to cover the side of the radiator 2. At this time, the radiator cover 1 is comparatively small in size at the left side, so attachment is simple and can be completed even if large sized components such as a cowling are not used.

While travelling, travelling air enters into the duct 26 extending longitudinally from the introduction port 13 as fresh air, flows towards the rear of the vehicle and is blown out behind the radiator cover. On the other hand, expelled air that is at a high temperature due to heat conversion after cooling the radiator is guided by the guide section 7 of the air blocking plate 3 and enters the expelled air path 28 of the radiator cover 1, flows in a lateral direction of the vehicle across the fresh air inside the duct 26 and is expelled outside the vehicle from the expelled air port 22.

At this time, if the louver 40 in the duct 26 is open, some of the expelled air in the expelled air path 28 enters the duct 26 and is mixed with the fresh air to raise the temperature of the fresh air. This mixed air has the direction at which it is blown out adjusted by the blowing out adjustment member 34 and is blown out behind the radiator cover 1.

Accordingly, a rider positioned behind the radiator cover 1 is warmed by the supply of fresh air that is controlled to an appropriate temperature, and it is possible to maintain favorable performance of the carburetor 4. Particularly when the motorcycle is used in a cold district or in cold weather, it is possible to increase the temperature to a preferred temperature to improve comfort, and icing of the carburetor can be prevented.

Also, by providing the air blocking plate 3, the air expelled from the radiator 2 does not flow to the rider and the carburetor 4 and it is possible to more effectively expel air outside the vehicle, and this is particularly applicable to large vehicles where it is easy for the expelled air to be heated with a large volume of expelled air. In the above description, by adopting a horizontally opposed engine, the carburetor 4 inevitably becomes positioned behind the radiator 2, but the influence of the expelled air can be avoided because of the air blocking plate which means that the effects are particularly noticeable when using a horizontally opposed engine.

Various specific structures are possible for this mixing means, for example, instead of the open and close type louver 40, any of various known types are possible, such as a rotating type or a sliding type. Also, the degree of opening can be regulated automatically instead of manually. Still further, it is possible to carry out the mixing inside the expelled air path 28 instead of instead of inside the duct 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator cover for a motorcycle, comprising:
    an engine;
    a radiator arranged in front of the engine; and
    a radiator cover for covering at least a portion of the radiator, said radiator cover having an intake path for guiding fresh air, and having an expelled air path for guiding hot air having been heated by heat exchange with the radiator,
    wherein the intake path of the radiator cover is provided with an opening section defined therein, the opening section having an actuation member for opening and closing the opening section.

2. The radiator cover for a motorcycle as disclosed in clam 1, wherein an air blocking plate is provided behind the radiator and in front of the engine and the carburetor, the air blocking plate directing expelled air from the radiator to the expelled air path of the radiator cover.

3. The radiator cover for a motorcycle as disclosed in claim 1, wherein the engine is a horizontally opposed engine.

4. The radiator cover for a motorcycle as disclosed in claim 1, wherein the intake path of the radiator cover is provided with means for directing air being exhausted from said intake path.

5. The radiator cover for a motorcycle as disclosed in claim 1, wherein the intake path runs in a first direction and the expelled air path runs in a second direction.

6. The radiator cover for a motorcycle as disclosed in claim 1, wherein the opening section adjoins the expelled air path.

7. The radiator cover for a motorcycle as disclosed in claim 4, wherein the means for directing air includes at least one adjustable louver.

8. The radiator cover for a motorcycle as disclosed in claim 4, wherein the means for directing air includes a rotating member for directing and a desired air flow.

9. A radiator cover for a vehicle, comprising:
    an engine;
    a radiator positioned in a vicinity of the engine;
    a radiator cover for covering at least a portion of the radiator, the radiator cover having an enclosed path within said radiator cover for guiding air, unaffected by heat produced by the engine and the radiator during operation of the vehicle, from a first end of the radiator cover to a second end of the radiator cover the enclosed path including an opening section defined therein, the opening section having an actuation means for opening and closing the opening section; and
    means for directing the air, said means attached to the second end of the enclosed path.

10. The radiator cover as disclosed in claim 9, further comprising an air blocking plate positioned downstream of said radiator, the air blocking plate ensuring air passing over and through the radiator is directed in an substantially lateral direction.

11. The radiator cover as disclosed in claim 9, wherein said means for directing air includes at least one adjustable louver.

12. The radiator cover as disclosed in claim 9, wherein said means for directing air includes a rotatable member.

* * * * *